Jan. 21, 1936.   A. MAIER   2,028,512
FREEWHEELING DEVICE FOR MOTOR VEHICLES
Filed Jan. 30, 1934
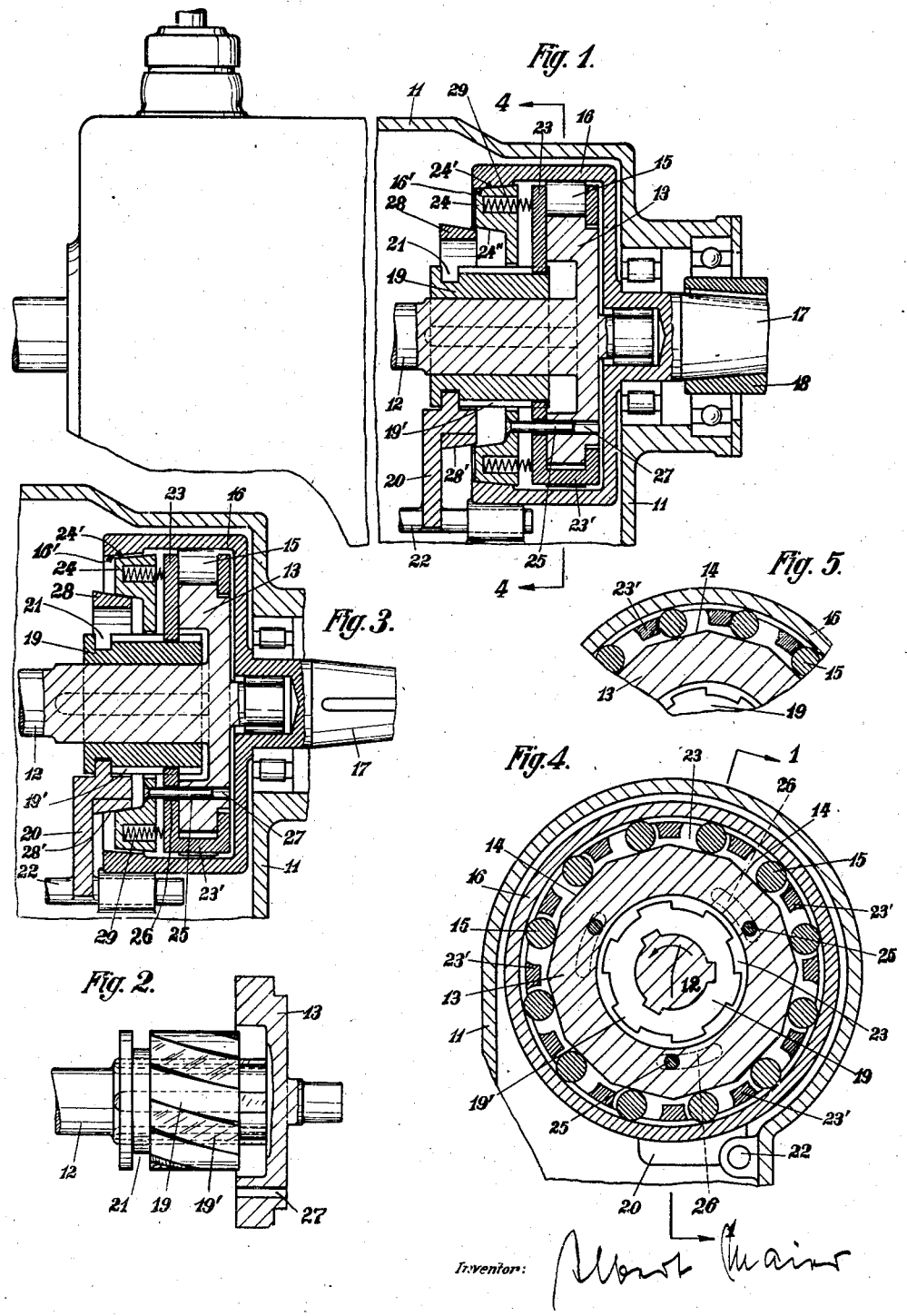
Inventor: Albert Maier Patented Jan. 21, 1936

2,028,512

UNITED STATES PATENT OFFICE 2,028,512

FREEWHEELING DEVICE FOR MOTOR VEHICLES

Albert Maier, Friedrichshafen, Germany, assignor to Zahnradfabrik Friedrichshafen Aktiengesellschaft, Friedrichshafen, Bodensee, Germany Application January 30, 1934, Serial No. 708,947
In Germany February 14, 1933

1 Claim. (Cl. 192—48)

My invention relates to free-wheeling devices for motor vehicles and has special reference to devices of this kind which are inserted behind the change speed gear. They may be enclosed by the main gear casing or they may be situated outside thereof, perhaps somewhere on the propeller shaft, as circumstances may afford.

Any additional clutch mechanism may serve for this purpose, but I prefer to use a kind of double-acting one-way clutch, as explained below.

The object of my invention is the combination of a friction device for synchronizing the shaft portions, when intending to change from free-wheeling to the coupled state, with a brake for braking the gear shaft after de-clutching for the purpose of more easily shifting the gears. This combination, according to my invention, is so constructed that only one operating member is necessary for operating both the friction device and the brake and for operating the additional clutch, the arrangement being made so that the different operations follow in the necessary sequence automatically.

The invention can be explained best when having reference to the drawing which represents an example embodying my invention.

Fig. 1 is a longitudinal vertical section through a mechanism of the type, (taken on line 1—1 of Fig. 4).

Fig. 2 is a side view of a detail of Fig. 1.

Fig. 3 is a longitudinal vertical section corresponding to Fig. 1 but showing the parts concerned in another position.

Fig. 4 is a vertical cross section, taken on line 4—4 of Fig. 1.

Fig. 5 is a fragment of Fig. 4 showing the parts in another position.

The casing of the change-speed gear is indicated at 11. Driven shaft 12 ends in a kind of disc 13 which has a polygonal outer circumference with inclined individual surfaces 14. On these surfaces 14 rollers 15 are situated adapted to co-operate with surfaces 14 and the inner annular surface of cylindrical member 16 which is made integral with shaft 17 to which the propeller shaft 18 is splined. There is a member 19 splined to shaft 12 adapted to be shifted longitudinally thereof by means of forked arm 20 fitting into groove 21 and fixed to shifting rod 22. The outer surface of member 19 is provided with helical splines 19' on which the cage 23 is splined so that this cage is turned over a certain angle relative to members 13 and 16 when member 19 is moved longitudinally of shaft 12.

Cylindrical member 16 at its left hand end has an internal conical friction surface 16' adapted to co-operate with a corresponding outer surface 24' on annular member 24. This latter member is held in its position by means of bolts 25 which penetrate through slits 26 in cage 23 and which extend into corresponding holes 27 of disc 13 so that member 24 rotates together with shaft 12, whereas member 16 forms part of shaft 17 and rotates therewith.

Another annular member 28 is fixed to forked arm 20 and has an outer conical braking surface 28' adapted to co-operate with a corresponding inner surface 24" of member 24. There are springs 29 tensioning member 24 towards the left.

The mechanism operates in the following manner:

Assuming the state as shown in Figs. 1 and 4 in which member 19 is in its left hand position and the fingers 23' of cage 23 are so situated between rollers 15 that these are free to jam in both turning directions, which means that we have a two-way clutching effect between disc 13 and member 16, or shaft 12 and shaft 17, respectively. The rollers 15 in Fig. 4 are shown in the position in which they transmit rotation from shaft 12, turning in the direction of the arrow, to shaft 17. Now the driver wants to come to a free-wheeling state for changing speed. He turns the gas off and de-clutches the main clutch which is not represented. Consequently propeller shaft 18 and shaft 17 begin to overrun shaft 12 because of the on-rolling car. Rollers 15 move into their other jamming position and tend to transmit rotation from member 16 to disc 13. The driver now shifts sleeve 19 towards the right thereby turning cage 23 so that rollers 15 are moved out of their jamming position thereby interrupting the driving connection between shaft 17 and shaft 12 through rollers 15. At the same time member 28 moves towards the right and with its surface 28' bears against member 24 thereby causing this member to move towards the right also and thereby removing surface 24' from surface 16' of member 16. Further movement to the right of member 28 by means of forked member 20 and rod 22 causes a braking effect between surfaces 28' and 24'' thus actually braking shaft 12 so that the intended speed change can be effected easily. The roller and cage end position is indicated in Fig. 5.

If the driver thereafter wants to drive on again he moves the member 19 back towards the left thereby causing members 28 and 24 to move to the left also until surface 24' bears against surface 16' so that members 16 and 24, that is shaft 17 and shaft 12, are caused to come to equal speed of rotation, member 28 being moved further to the left so that surfaces 24" and 28' get out of contact. At the same time the projections 23' of cage 23 are moved back from their position shown in Fig. 5 to that represented in Fig. 4 so that the rollers 15 are again free to cause jamming connection between 13 and 16 in either direction of rotation. Now the driver can put the clutch in and give gas again.

I do not want to be limited to the details described or shown in the drawing as many variations may occur to those skilled in the art.

What I claim is:

A device of the type comprising: two shafts substantially in alignment with each other; means for connecting both shafts in either direction of rotation; means for eliminating the connecting effect in one driving direction; a fixed friction surface; a rotating friction surface in fixed relation to one of said shafts; a shiftable rotatable member having two different friction surfaces, one of said latter surfaces being adapted to co-operate with said fixed friction surface and the other one being adapted to co-operate with said friction surface in fixed relation to one of said shafts; means for shifting said shiftable member alternately into and out of either operative position; and means for operating said connecting means between said two shafts; said operating means being in operative connection with said means for shifting said shiftable member.

ALBERT MAIER.